United States Patent [19]

Olson et al.

[11] 3,976,793

[45] Aug. 24, 1976

[54] BREAKFAST CEREAL PROCESS AND PRODUCT

[75] Inventors: Robert D. Olson, Springfield; Robert H. Eifler, Battle Creek, both of Mich.

[73] Assignee: General Foods Corporation, White Plains, N.Y.

[22] Filed: Feb. 25, 1975

[21] Appl. No.: 552,918

Related U.S. Application Data

[63] Continuation-in-part of Ser. No. 537,633, Dec. 30, 1974, abandoned.

[52] U.S. Cl. ............................ 426/96; 426/302; 426/310; 426/457
[51] Int. Cl.² .................... A23B 9/00; A23L 1/10
[58] Field of Search .......... 426/302, 656, 446, 658, 426/454, 305, 457, 310, 559, 307, 560, 96

[56] References Cited
UNITED STATES PATENTS

| | | | |
|---|---|---|---|
| 2,130,087 | 9/1938 | Hasbrouck | 426/457 |
| 3,121,637 | 2/1964 | Clausi et al. | 426/446 |
| 3,792,183 | 2/1974 | Lyall et al. | 426/307 |
| 3,814,822 | 6/1974 | Heabhorn et al. | 426/302 X |
| 3,814,824 | 6/1974 | Bedenk et al. | 426/446 X |
| 3,840,685 | 10/1974 | Lyall et al. | 426/305 X |
| 3,868,471 | 2/1975 | Decelles et al. | 426/305 X |
| 3,876,811 | 4/1975 | Bonner et al. | 426/307 X |

FOREIGN PATENTS OR APPLICATIONS

| | | | |
|---|---|---|---|
| 200,497 | 5/1954 | Australia | 426/302 |
| 558,307 | 8/1942 | United Kingdom | 426/457 |

*Primary Examiner*—S. Leon Bashore
*Assistant Examiner*—Kenneth M. Schor
*Attorney, Agent, or Firm*—Bruno P. Struzzi; Mitchell D. Bittman; Michael J. Quillinan

[57] ABSTRACT

An improved sugar coated ready-to-eat breakfast cereal flake composed principally of oat and soy flour has enhanced crispness retention and sweetness impact by impregnation of the flake surface with a dilute sweetening syrup which is crystallized thereon so as not to be grossly visible.

12 Claims, No Drawings

BREAKFAST CEREAL PROCESS AND PRODUCT

CROSS REFERENCE TO RELATED APPLICATION

This application is a continuation-in-part of Applicants' copending application Ser. No. 537,633 filed Dec. 30, 1974 and now abandoned.

BACKGROUND OF THE INVENTION

In the production of ready-to-eat breakfast cereals, it is desirable to provide a balanced ration that is high in oats and soy flours whereby nutrition stemming from a high protein content is afforded. Combining cereal flours in this manner and converting them to a toasted ready-to-eat breakfast cereal flake is enabled by the process described in U.S. Pat. No. 3,121,637 to Clausi et al. issued Feb. 18, 1964 for Breakfast Cereal Process. Whereas this process provides an improvement in the art of blending cereal flours and converting same into a highly nutritious oat/soy flake, consumers have objections to the product. Upon being wetted in milk, the product is inclined to lose crispness prematurely and when wetted become limpid; it is the principal object of this invention to reduce such premature loss of crispness while at the same time providing an improved sweetness impact. Moreover, such flakes under aggravated high humidity storage are inclined in such state to lose crispness retention as a consequence thereof such that a flake when wetted will be tough and inclined toward a soggy condition prematurely. A collateral object is to provide a coating which imparts little or no glossiness to the flake and thereby provides a wholesome, more organoleptically acceptable appearance.

To explain more fully, high protein content breakfast cereal flakes composes principally of oat and soy flours and which may be partially supplemented by other proteins that are lacteally derived, such as lactalbumin or sodium caseinate, have a less crisp eating quality which is attributable to the composition of the toasted flake. The oat content, which desirable will be in excess of 25%, characteristically has a relatively high protein content and also contributes a significant level of flour fat; the corresponding reduction of the amylaceous carbohydrate content in any such lightly fortified nutritious dough renders the dough when converted into a toasted flake less inclined to puff into a crisp desirably blistered flake like that of toasted corn flakes which are lower in protein and fat. Also, the toasted oat/soy flake typified by the product of the Clausi et al. process cited hereinabove, when wetted to a 4%–5% content by moisture pick-up during packaging in transportation and warehousing, becomes soft with lessened resistance to the bite with continued storage at these moistures; such flakes stored for periods say in the order of six months will, after absorbing sufficient moisture to reach a so-called critical moisture content of about 4%, change in texture and become limp even before wetting in the bowl; the fat in combination with the protein in such flakes renders the flake prone to a soft though continuous form; the high protein and fat content of such flakes as well as the relatively inert texture contribution of the soy flour and any optionally added lacteally-derived protein coupled with a significant reduction in the cereal starch content of the dough, particularly when quantities of sugar in the order of 15% – 25% are also present thus have an overall undesired effect on product texture. The ultimate toasted flake is less likely to assume a crispness that many consumers prefer. The flake per se is more inclined to lose its initial desired crisp eating qualities upon moisture pick-up.

objects of this invention are to slow the rate of moisture gain and afford acceptability at high moisture levels of such protein fortified cereal flakes and protract shelf life in the field without a sacrifice in crispness before and after wetting in milk and without need for expensive packaging material.

STATEMENT OF THE INVENTION

In accordance with its broadest aspects, these objects are met by impregnating the flake with a sucrose solution that is low in amorphous lower melting sugars. In manufacturing the flake, a cereal flour mixture is processed under conditions which substantially retain nutritive value by gelatinizing moistened oat and soy flour components; converting the gelatinized mass into a dough piece having a moisture content suitable for conversion into a flake; converting the dough piece into a flake preferably by partial drying preparatory to flaking and mechanically modifying the dough to a flake form and toasting the flake to a moisture content that is stable. A hot dilute impregnant, i.e., an unsaturated solution of a natural sweetening agent high in sucrose and having a Brix ranging usually between say 60° and 75° at 20°C., although still higher degree Brix may be practiced, is applied to the toasted flake; this application is caused to occur preferably in a coating reel wherein the relatively dilute syrup coats and impregnates the flake surface by virtue of low syrup solids concentration and its dilute condition; after such impregnation, the coating solution is caused to be concentrated by elevating the temperature of the flake and maintaining it at an elevated temperature sufficient to cause evaporation and concentration of the coating solution; the heated syrup constituents on the flake surface are caused to crystallize discretely as they are infused in and absorbed on the flake surface.

The resulting flake product is novel and has meritorious organoleptic qualities as judged by consumer testing. The product is judged to have improved crispness retention when added to milk or cream versus a control which is not coated by a sugar solution. The ability to infuse a toasted cereal flake high in both oat and soy flours and locate discrete crystal moieties in the flake surface as a consequence of impregnation of the dilute solution results in an improved sweetness impact. It would appear that location of discrete crystal moieties in the flake surface achieves a limitation on the rate at which aqueous mediums such as milk, whole or skim and cream, will hydrate and soften the toasted cereal product. The surface sweetening impact is pleasing and preferred by users over more conventional ready-to-eat cereal forms whether consumed hot or cold.

At low moisture contents the toasted oat/soy flakes are brittle and desirably crisp; as they absorb moisture, the crystallized saccharides present in the flake per se, cause the flakes to become less tough and leathery. Thus, the coating impregnation practices of this invention control and arrest the transition of the flake from its desirably crisp to a less preferred leathery state in dry packaging. Hence, the flake pieces pass through exposure in packaging, warehousing and shipment and at high relative humidities and high packaging temperatures without a premature loss of crispness. The flake pieces essentially retain a grossly-invisible sugar structure having a substantially nonamorphous character which under high temperature or high humidity or both is less likely to convert into softened sugar solutions which also would otherwise contribute to a loss of sweetness.

The foregoing explanations are theoretical and not intended to be limiting, but merely serve as explanatory bases for rationalizations for the established crispness retention characterized by the sucrose-impregnated high oat/soy flakes coated in accordance with the invention.

Whereas it is conceded as prior art to attempt a sugar impregnation and coating of higher starch content read-to-eat breakfast cereal flakes, the cereal flake of this invention involves a cooperative effect between the crystalline sugar coating and impregnant on the one hand and the relatively high protein-fat and reduced starch content on the other hand of flakes produced in accordance with the cited Clausi process. The sugar crystals per se offer a structural stability to the overall flake against the effects of moisture pick-up and also serve to provide a barrier to moisture pick-up during the packaging and thus retard or delay the effect of humidity in converting the proteinaceous-fat content of the flake to the undesired soft, limpid condition specified.

DETAILED DESCRIPTION OF THE INVENTION

The process for preparing the breakfast cereal product suitable for use as stated herein will be preferably that described in U.S. Pat. No. 3,121,637 described aforesaid. As indicated, this cereal product will contain a high proportion of both oat and soy flour and commonly will also include wheat flour and optionally a lacteal-derived protein such as dry skim milk solids, lactalbumin, sodium caseinate or mixtures thereof for nutritional balance; it is a feature of this invention that the formulation of oat flour will be combined with a substantial level of soy flour such that the range of oat flour will be between say 30% and 45% by weight of the flake ingredients and the range of soy flour between 25% and 35% so that the oat and soy flour combination generally represent at least a major weight percent of the ingredients on a dry basis. But the invention is not to be restricted to the use of a major weight percent of oat and soy flour in combination since a lesser amount may be similarly employed with a balancing of the ration through use of say wheat flour and lacteal milk protein derivatives as aforesaid. Generally, however, the oat, soy and lacteally-derived constituents will represent in all cases a major weight percent of the ingredients that are employed to formulate the read-to-eat breakfast cereal product.

The product as indicated will be converted into a hydrated dough piece having a moisture content of 18% – 26% as specified in the cited Clausi patent by cooking in a continuous cooker and pelletizing the cooked dough mass to a condition wherein the individual pellets may be subsequently dried, typically to a moisture content of below 21% prior to flaking, broadly within the range of 15% –20%, this preferred range not being critical but rather being representative of conditions operative to effect flaking of the pellet by conventional cereal finishing techniques of flaking through rolls to compress, flatten and thereby create a flake that will toast to a desired texture. The pellet may be tempered at ambient room temperature for 1–3 hours and flaked or may be flaked hot as received from the drying. The flake will thereupon be subjected to a toasting operation of the kind set forth in the aforesaid patent but optimally will also be of a type described hereinafter by reference to the accompanying operative example. For most commercial applications, a travelling screen dryer will be used to effect drying air temperatures between 250° and 350°F. and coincident caramelization and flavor development. The dried flake is thereby in a condition to undergo surface application of the dilute sweetening solution; uncoated, the flake is prone to become soft and lose crispness more readily than whole grain flakes as a class when wetted in milk or cream.

The coating solution is essentially an unsaturated sucrose solution, although salt and flavorings to suit taste may be added in accordance with the skill of the art. In addition, vitamins, minerals and other supplements may be included in the coating solution. In small quantities, a reducing saccharide mixture such as a corn syrup derived by starch hydrolysis may be employed, say up to a level of 5%; it is a preferred practice of the invention herein to avoid use of a high level of reducing saccharides in order that crystallization will not be retarded, it being a primary function of the practices of this invention to induce relatively non-hygroscopic crystallization sites on the flake coincident to the coating process.

Viscosity of the sugar solution is a function of its solids concentration and temperature; it is important that initial viscosity be so reduced as to effect impregnation of the dilute sugar solution into the surface of the flake structure. The extent of impregnation is influenced by the composition of the toasted flake produced as well as the solids content of the saccharides present in the solution. The coating solution soaks partially into the flake and substantially uniformly coats the surface as it is absorbed therein. In a broad range, the concentration of the solution will be between 40° – 80° Brix, the more dilute the solution the greater degree of impregnation that may be practices; but there is a limiting factor in this regard in that with highly dilute solutions larger amounts thereof must be applied and mechanical problems incident to drying are encountered; a flake coated by a dilute solution may be inclined to mat during early drying, particularly at moisture contacts above 14%, making the ultimate product difficult to break up and dry as discrete flakes; also, there is a change in the flavor detected as well as a change in color primarily because of the necessity for prolonged drying. The resultant eventually dried flake has a hardness stemming both from wetting and also from the solids contributed by the sugar coating.

It is desired to avoid changing the physical appearance of the coated product from that of an uncoated crisp, partially blistered or semipuffed flake. There should be such impregnation that the coated solids are not grossly discernible in the final form; thus, there should be sufficient impregnation of coating solution to minimize existence of a surface gloss such as is obtained with a more viscous application of a sugar solution. The higher the concentration that is practiced, incident to preparing the solution or occasioned during drying the solution on the flake, the larger will be a given crystal size in the coating, it is visualized in accordance with this invention that drying produces discrete fine crystals which are located in the vesicles or void spaces intermediate the amylaceous constituents of the flake so that the coating is not visible to the unaided side-by-side comparisons, many consumers find it relatively difficult to discern between an uncoated and a coated flake. Since this process is intended to be employed in the beneficiation of cereal products that are high in protein and overall nutritional value, it is therefore an advantage of this invention to achieve a limited but not readily discernible topical application of the sweetening solution.

Having applied the coating solution as specified herein, it will be subjected to a drying operation wherein the infused impregnating solution will be caused to undergo a relatively rapid concentration through evaporation of a major amount of its moisture content in an elevated temperature zone, i.e., above 225°F. In a coating reel wherein the coated impregnated flakes are agitated by tumbling there may be a slight concentration of the solute phase of the coating to a point where micro-crystalline sugar moieties are created at points of solution admission to the flake. But generally, after-drying is required to achieve required concentration and crystallization of the sugar solids; such drying will be practiced under conditions which avoid flake temperature elevation above 350°F.; more commonly flake temperature will be 300°F. during evaporation from the coated flake and caramelization, if any, is minimal; during drying the temperature-moisture relationships are not critical except to avoiding caramelization and loss of nutritional value; drying conditions will be simply those employed to effect a stable moisture content of 2.0% to 4.0%, all of which is within the skill of the calling of art experimenters following this enabling disclosure.

Commonly, the coating solution will have a sugar solids content of 65% –75% and be applied at a level of 5% – 20% by weight of the flaked product being coated; as a result of drying the dilute coating solution, the soluble sugar solids level will be increased by 3% – 10% of the flake (dry basis). It is preferred that drying of this solution occur under conditions which do not elevate flake temperature above 300°F. In this way, undesired caramelization reaction precursors are avoided and a properly impregnated flake is achieved without substantial quality degradation.

The invention will now be understood by more specific details thereof which appear in the accompanying operative example.

BEST MODES

| Unimpregnated Base Flake Ingredients | Parts by Weight | | | |
|---|---|---|---|---|
| | Example I | | Example II | |
| | Ranges Where applicable | Specific level | | Specific level |
| Oat Flour | 30–40 | 36.9 | 35–45 | 40.0 |
| Sucrose | 19–23 | 21.1 | 13–17 | 15.1 |
| Soy Flour | 27–31 | 29.0 | 29–33 | 31.5 |
| Lactalbumin | 0–6 | 4.9 | 4–6 | 5.3 |
| Salt | 2–3 | 2.6 | 2–3 | 2.6 |
| Malt Flavoring | 2–0 | 2.0 | 2–0 | 2.0 |
| Calcium Carbonate | 0.1 | | 0.1 | |
| Flavor | 0.1 | | 0.1 | |
| Vitamin C | 0.1 | | 0.1 | |
| Iron | 0.05 | | 0.05 | |
| Antioxidant | 0.01 | | 0.01 | |
| Niacin | 0.01 | | 0.01 | |
| Vitamin A | 0.03 | | 0.03 | |
| Vitamin B6 | 0.003 | | 0.003 | |
| Vitamin B2 | 0.002 | | 0.002 | |
| Vitamin B1 | 0.001 | | 0.001 | |
| Vitamin D about | 0.003 | | 0.003 | |
| Vitamin B12 | 0.001 | | 0.001 | |
| Moisture | 2–4 | 3.2 | 2–4 | 3.2 |

Example I contains 22% total sugars based upon the unimpregnated base flake plus 4% additional in the unimpregnated coating. Example II contains about 16% total sugar in the unimpregnated base flake plus 6 additional in the impregnated coating.

The foregoing specification of ingredients are the total sugar-coated product constituency, including that of the sugar application. It will be understood that the vitamin and mineral supplements and flavoring may be employed as part of the dough matrix but ideally they are preferably included in the sugar-coating solution; it should be noted that in any sugar impregnation application, the mineral constituents, i.e., the calcium carbonate and the iron are included in the dough.

Process. Dry ingredients are homogeneously blended and sufficient moisture is added to form a mixture having a moisture content of about 22%, it being understood that some sucrose is omitted from the dry ingredient for the base flake and thus it contains oat flour, soy flour, wheat flour, lactalbumin, calcium carbonate and iron. The remaining ingredients listed are blended into the aqueous medium, i.e., water, used to establish a syrup, to wit, the sugar, salt, malt flavoring, vitamins. The mass of mixed amylaceous constituents is blended with the syrup until the dry materials form agglomerates. The agglomerates are then introduced into a jacketed cooking vessel equipped with agitating means. The mass of agglomerates is then steam cooked and agitated at a temperature of 240° – 260°F. using a steam pressure of about 15 psig, (broadly 13 – 17 psig) for about 7 to 10 minutes. The cooked agglomerates are then charged to an extruder wherein they are compacted as well as cooled to 180°F. The compacted dough mass issuing from the extruder is then subdivided into dense pellets; the pelletizing extruder will be surrounded by a cooling jacket to reduce vapor pressure in the dough moisture whereby a dense extrudate is formed; the gelatinized agglomerates charged to the extruder are caused to absorb approximately 2% added moisture in the form of steam which is condensed in and becomes a part of the mass undergoing cooling and extrusion; this method is more fully described in U.S. Pat. No. 3,506,454 issued Apr. 14, 1970 to Reesman for Process for Producing Puffed Dough Pieces. Essentially, the extrudate is characterized by a relatively continuous matrix of dough ingredients occupied by a minimum degree, if any, of voids, there being a uniform distribution of moisture throughout the pellets.

Pellets thus produced are then dried to about 17% moisture and bumped through flaking rolls operative to reduce flake thickness to 0.015 to 0.025 inches. The pellets prior to flaking and after drying are preferably about 110°F and generally below 130°F by a draft of cool or refrigerated air employed in the terminal chamber of the pellet drying oven.

Flakes are eventually toasted in a conventional manner in an oven employing a travelling screen to reduce the moisture content to below 5%, preferably to about 2% – 3%, and caramelize the cereal and develop characteristic flavor and color. The cereal flake thus collected may be allowed to cool in a tote or like bin, but cooling is preferably augmented by a cooling section employed at the end of the toasting oven to facilitate bin storage prior to coating. Cooled flake is now ready to be coated, although freshly produced warm flakes may be similarly coated.

To a liquid syrup of 70% sucrose and 30% water is added artificial flavor (vanilla) and optionally the vitamins specified. The syrup is warmed to a temperature of about 180°F. The cool flakes are charged to a coating reel equipped with flame heaters operative to maintain an elevated ambient temperature in the reel of about 180° – 230°F., reel temperature depending upon charge to the reel and rate of passage therein. The flakes in turn will be warmed as well as the syrup applied by spraying thereto. In lieu of a spray coating, a flow-on syrup application may be employed but a spray application is believed preferable for facilitating complete coating. The reel has an approximately 3½ foot diameter and 17½ foot length and is equipped with flights adapted to tumble flakes therein while advancing same and thus agitating to promote crystallization. A pipe delivering syrup to a nozzle is most preferably employed to spray the coating solution onto the flakes, although a droplet application of syrup may be similarly employed. The means of application are optional and within the skill of the art. To effect coating in the preferred manner, the flakes are tumbled with the impregnating coating solution for 3–4 minutes or for that period which renders them relatively free-flavoring as tumbled. Elevation of flake and coating solution temperature by reason of the flame or other means is required to occasion uniform distribution of solutes around the flakes incident to tumbling and impregnation. Eventually, the coated flakes are recovered warm from the discharge end of the reel, typically at a temperature of approximately 180°F. The coated flakes are recovered at a moisture content of about 2% – 4% above that of the starting moisture of the cereal product per se prior to coating, say to the neighborhood of 5% – 7%. The coated flakes are thereafter charged to an after-dryer operating at an inlet air temperature of 225° – 250°F; the coated flakes are thusly redried to a moisture content of about 2 ½% and broadly 2% – 4%; preferably the flakes will be cooled in the terminal portion of the dryer.

The impregnated product thus produced can be consumed without substantial loss of its crispness despite immersion in milk and equivalent aqueous mediums for a period of 4 minutes and has a noticeable sweetness impact. Generally speaking, the product characteristics are such that the product will retain its crispness in milk at 68°F. for a practical period as long as six minutes more commonly three minutes, depending upon the level of flake surface sugar additions. The flake is crisp and does not have a discernible sugar coating. The flakes when subjected to stress-humidity conditions of 50% relative humidity at 70°F. in an open dish and tested against an uncoated flake control was crisper and less soggy as evaluated by a skilled panel of experts sampling the products both dry and wetted in milk. The flake can be packaged in conventional cartons of average water-vapor transmissability which need not be overwaxed or contain a glassine liner.

In all of the foregoing operative examples it will be important to minimize the effects of heat and elevated temperatures throughout the processing. The invention has its most advantageous application in the treatment of lightly toasted cereal flakes derived from high protein flours wherein the protein content has a high efficiency rating. The effects of heat and high temperatures in providing organoleptic crispness tends to degrade flake protein quality. However, by virtue of the ability to infuse the coating solution, a crispness retention is afforded which ameliorates the tendency of such flakes to become soggy and lose their crispness to a consequential extent.

Thus in practicing the invention blends of high protein cereal flours will be converted into cooked agglomerates and compacted cereal doughs that at no time are elevated to a temperature above 300°F. for substantial periods. Likewise the flaked pellets will be toasted under conditions whereat they will not be elevated in temperatures above 325°F. incident to toasting for periods exceeding ten minutes.

Whereas such crisp flakes derived from such protein flours will eventually turn limpid and soft or leathery when immersed in milk, the coating processes are operative to effect impregnation as afore-described and improve the ability of the flakes to retain crispness within reasonable limits.

The invention will now be more fully understood and interpreted by the accompanying set of claims.

We claim:

1. An improved process of manufacturing a nutritious, sugar-coated ready-to-eat cereal flake which comprises forming a cooked cereal dough wherein the farinaceous ingredients consists essentially of oat and soy flours, the dough having a moisture content of 18% – 26%; pelletizing the cooked dough in a densified state and partially drying the pellets to a moisture content suitable for flaking; flaking the partially dried pellets; toasting the flakes to a moisture content below 5%; wherein the improvement comprises: coating a hot, dilute, and unsaturated aqueous sucrose solution onto the toasted flake surface at a concentration which initially facilitates penetration of the flake to cause the solution to impregnate the surface thereof; and heating the surface-coated flake to rapidly concentrate the coating solution thereon, cause crystallization of the coating solids, and redry the flakes to a moisture content of 2% – 4%.

2. Process of claim 1 wherein the coating solution has less than 5% reducing saccharides.

3. Process of claim 1 wherein the level of oats and soy flours in combination is a major weight percent of the uncoated cereal flakes and wherein the solution is applied at a level of 5% – 20 % by weight of the flake as coated.

4. Process according to claim 3 wherein the oat flour is 30% to 45% and the soy flour is 25% to 35% by weight of the cereal dough.

5. A process according to claim 1 wherein the coating solution is 60° – 75° Brix.

6. Process according to claim 5 wherein the toasted cereal flakes are tumbled in the coating zone and wherein the hot dilute coating solution is applied therein with continued tumbling until the coated flakes are free-flowing.

7. The process of claim 6 wherein the sugar solids added by coating same increase the weight of the composition by 3% – 10%.

8. A process according to claim 7 wherein the coating solution is concentrated on the flake by heating same at a temperature below 325°F.

9. A process according to claim 1 wherein the cooked dough temperature is below 300°F. and wherein the flaked pellets are toasted at a temperature below 325°F.

10. The process of claim 9 wherein the level of oats and soy flours in combination is a major weight percent of the uncoated cereal flake.

11. Process according to claim 9 wherein the oat flour is 30% to 45% and the soy flour is 25% to 35% by weight of the cereal dough.

12. The ready-to-eat breakfast cereal flake produced by the process of claim 1.

* * * * *